United States Patent

[11] 3,545,704

| [72] | Inventor | Sigmund P. Rose<br>25-03 Steinway St., Astoria, Long Island,<br>New York 11102 |
|---|---|---|
| [21] | Appl. No. | 823,871 |
| [22] | Filed | May 12, 1969 |
| [45] | Patented | Dec. 8, 1970 |

[54] PARACHUTE OPENING DEVICE
7 Claims, 5 Drawing Figs.

| [52] | U.S. Cl. | 244/149 |
|---|---|---|
| [51] | Int. Cl. | B64d 17/70 |
| [50] | Field of Search | 244/142, 145, 147, 149 |

[56] References Cited
UNITED STATES PATENTS

| 1,194,691 | 8/1916 | Adams | 244/145 |
| 1,644,251 | 10/1927 | Hawes | 244/145 |
| 2,553,909 | 5/1951 | Frieder | 244/149X |
| 2,960,296 | 11/1960 | Sepp, Jr. | 244/149 |
| 3,117,753 | 1/1964 | Ewing | 244/145 |

Primary Examiner—Milton Buchler
Assistant Examiner—James E. Pittenger
Attorney—Charles E. Baxley and Thomas E. Tate ABSTRACT: This invention is directed to a parachute in which the canopy is provided with a pair of opposed relatively deep gore-shaped notches extending upwardly from its periphery. An outwardly displacable extended gore segment has its upper end secured adjacent the closed inner end of each notch and its free outer end connected to a periphery of the canopy by symmetrically disposed lift lines. Resiliently biased plates are located adjacent the upper portion of the gore segment to positively displace outwardly at least a portion of same after the parachute has become fully deployed from its pack and means are provided for rendering the biased plates ineffective until after the parachute has become fully deployed from its pack.

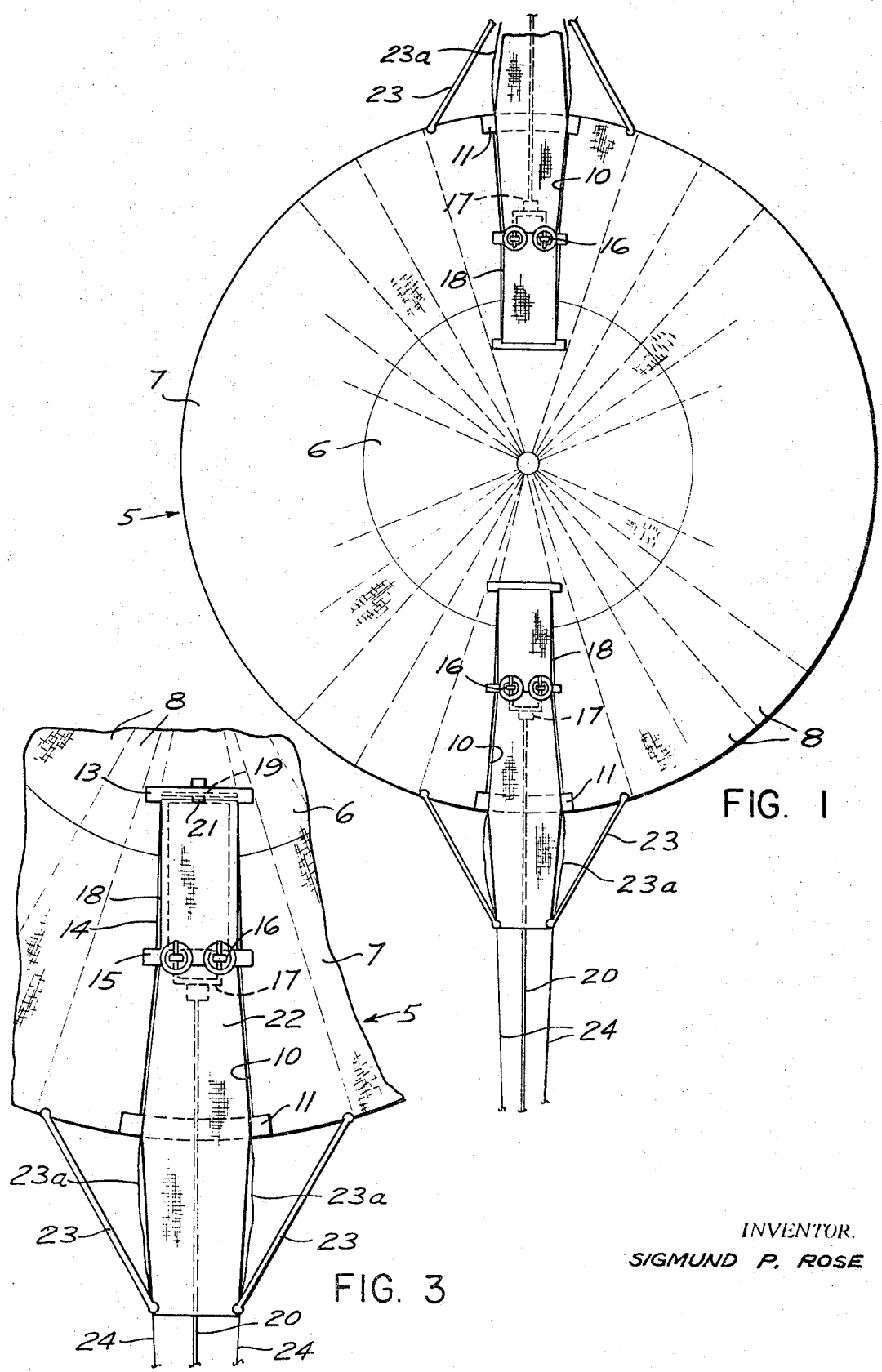

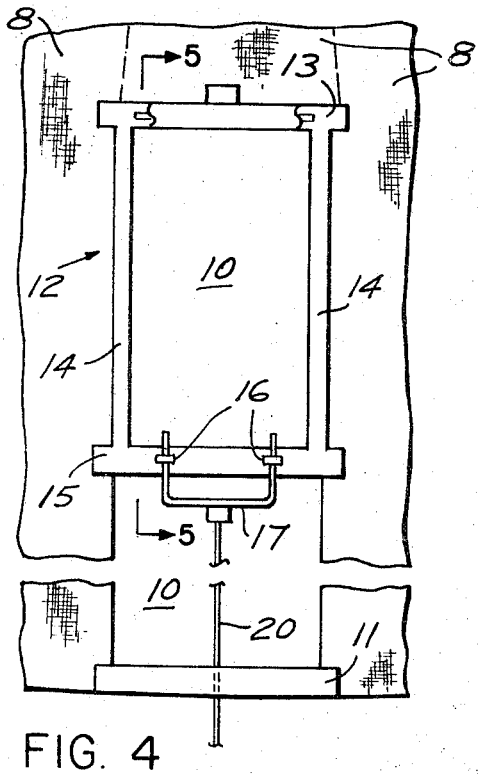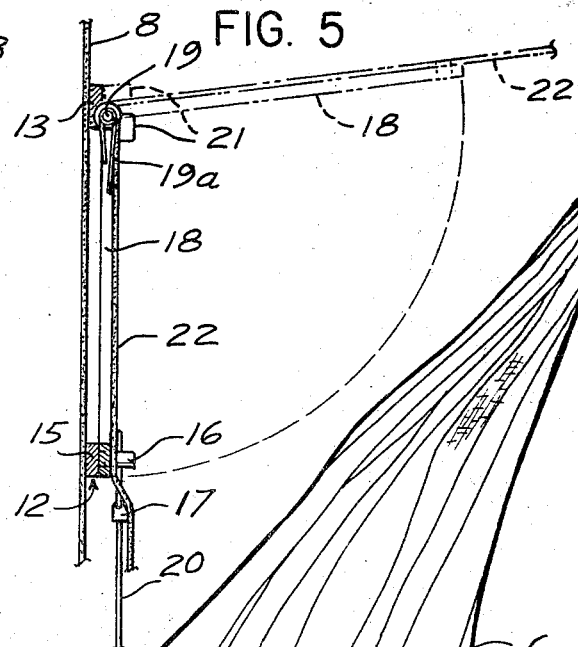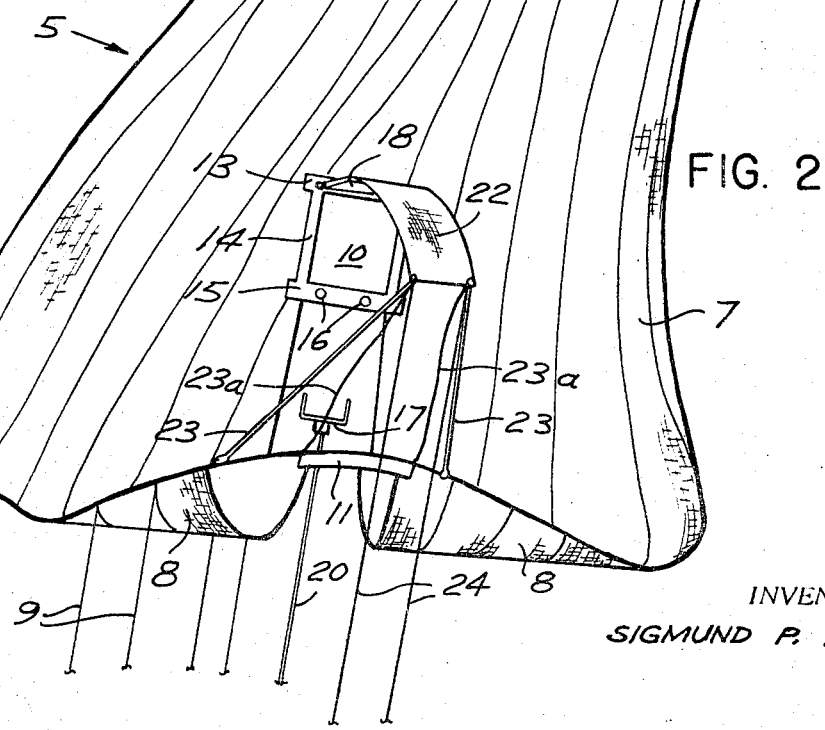

3,545,704

PARACHUTE OPENING DEVICE

THE INVENTION

This invention relates generally to new and useful improvements in parachutes, and particularly seeks to provide novel means for positively effecting the initial opening of the skirt of a parachute as soon as the parachute has become fully deployed from its pack so that the entire canopy will open quickly.

It has been frequently observed that even properly packed parachutes will exhibit delays in opening due to unpredictable atmospheric conditions and to some abnormality in the manner that the deployed canopy enters the air stream, relative to altitude, density, pressure or velocity and in extreme cases they have only partly opened or have failed to open at all. Thus, a continuing problem with parachutes is to find ways for positively forcing the opening of the mouths of their canopies when deployed, but without interfering with their normal packing patterns and without substantially increasing their bulk or weight.

A parachute constructed in accordance with this invention overcomes such problem.

Therefore, an object of this invention is to provide a novel parachute having built in means for positively initiating the opening of the parachute skirt as soon as the entire parachute has become deployed from its pack regardless of atmospheric conditions.

Another object of this invention is to provide a parachute of the character stated in which the opening means includes a pair of diametrically opposed, outwardly displacable, extended gore segments that initially serve as full blown air scoops to move corresponding peripheral edge portions of the parachute skirt outwardly and upwardly to create a void or opening for the ready admission of air into the canopy for the quick opening thereof.

Another object of this invention is to provide a parachute of the character stated in which the upper end portion of each displacable extended gore segment is attached to a spring-loaded hinged actuating frame and the free end of the extended gore segment is cord-connected to the periphery of the skirt.

Another object of this invention is to provide a parachute of the character stated in which cord-actuated locking pins are employed to secure the hinged actuating frame in its normally closed position until the parachute has become fully deployed from its pack.

A further object of this invention is to provide a parachute of the character stated in which suspension or shroud lines are also attached to the free end of the displacable extended gore segment to draw same back into the general canopy configuration as the parachute becomes fully opened.

With these and other objects, the nature of which will be apparent, the invention will be more fully understood by reference to the drawings, the accompanying detailed description and the appended claims.

In the drawings:

FIG. 1 is a top plan view of a parachute canopy constructed in accordance with this invention, and is deliberately distorted in order to more clearly illustrate the relative positions of the opening devices as they would appear at the time the parachute is to be folded for insertion into its pack;

FIG. 2 is a side elevation of the parachute canopy immediately after it has been deployed from its pack and shows one of the extended gore segments in its outwardly displaced configuration as an incident to forcing the entire canopy to open completely;

FIG. 3 is an enlarged fragmentary detail top plan view of a portion of FIG. 1 and shows the attachment of the gore segment to the movable part of the actuating frame; and FIG. 4 is an enlarged fragmentary detail top plan view of the fixed portion of the actuating frame; and FIG. 5 is a detail section taken along line 5-5 of FIG. 4 and shows the spring-loaded hinged connections between the fixed and movable parts of the actuating frame.

Referring to the drawings in detail the invention, as illustrated, is embodied in a parachute that includes a generally hemispherical canopy indicated at 5 and having a crown portion 6 and a skirt portion 7 collectively formed by a multiplicity of gores 8. The usual multiplicity of suspension or shroud lines 9 extend downwardly from the periphery of the skirt 7 to the usual harness (not shown).

The lower portions of two diametrically opposed gores 8 are cut out to define gore width trapezoidal notches 10,10 that extend from the rim of the canopy upwardly to a location slightly within the crown 6 and with which the parachute opening devices of this invention are associated. The lower open end of each notch 10 is closed by a fabric tape or plastic stay 11 that extends thereacross and has its ends secured to the associated peripheral edges of the adjacent gores to prevent separation thereof.

The opening devices each includes an actuating frame comprising a generally rectangular open stationary plate generally indicated 12 having an upper lateral bar 13 secured across the top of its associated gore notch 10, a pair of spaced parallel arms 14,14 secured to the adjacent gores 8 and a lower lateral bar 15 that spans the notch 10 and has its ends secured to the adjacent gores 8. A pair of locking studs or cones 16,16 are affixed to the bar 15 and are used in conjunction with a bifurcated locking pin 17 to retain the movable plate of the activating frame in its normally closed position until the parachute has become deployed, as will be hereinafter more fully described.

Each actuating frame also includes a generally rectangular open movable plate 18 that overlies the stationary plate 12 and is hingedly connected thereto along the bar 13 thereof as at 19. The hinge 19 preferably is of the type that contains a torsion spring 19a having one end attached to the stationary plate 12 and its other end attached to the movable plate 18 so that the movable plate is constantly biased toward its open position away from the stationary plate to the position shown in dotted lines in FIG. 5. The free edge of the hinged plate 18 is provided with suitable apertures (which may be grommeted) through which the studs or cones 16 extend and the bifurcated pin 17 is used to lock the plate 18 in its normally closed position against the biasing force of the hinge torsion spring. A pull cord 20 is used to release the pin 17 and the pivotal movement of the plate 18 may be suitably limited by an abutment stop 21 which contacts the upper part of the plate 12 when the plate 18 reaches its outer limit of movement. Alternatively, restraining cords attached to the free ends of the plates 12 and 18 could be used for the same purpose.

A displacable gore segment 22, that fits within each trapezoidal notch 10, has its upper end attached to the face of the hinged plate 18 and its lower end projecting a substantial distance beyond the periphery of the skirt 8. A pair of lift cords 23,23 extends from the free corners of the gore segment 22 to adjacent points on the periphery of the skirt 8 that are symmetrically disposed to either side of the median axis of the gore segment. A second pair of lift cords 23a,23a extends from the free corners of the gore segment 22 to the peripheral corners of the notch 10.

When the opening devices as described above are included in a parachute, it may be packed or folded in its normal manner prior to use. In use, when the parachute has been deployed from its pack, the locking pin release cord 20 is pulled by the parachute harness to remove the locking pin 17 from its engagement with the studs 16 to release the hinged plate 18 and permit it to swing to the dotted line position shown in FIG. 4. This effects an outward displacement of at least the upper part of the gore segment 22 into the air stream adjacent the unopened canopy and causes the gore segment to act as an air scoop which applies an outwardly directed lifting force to the cords 23 which in turn lift and separate diametrically opposed peripheral edge portions of the skirt 8 to partly open same for the quick admission of air to the interior of the canopy.

A pair of suspension lines 24,24 connect the free corners of each gore segment 22 with the parachute harness so that when the canopy becomes fully opened, the gore segments will be pulled down so that their upper portions will fit into the notches 10 in general conformity with the contouring of the open canopy and their lower downwardly extending free end portions will provide additional braking and stabilizing areas for the parachute.

I claim:

1. In a parachute wherein is provided a generally hemispherical fabric canopy formed from a multiplicity of gores, and a multiplicity of suspension lines extending from the periphery thereof to a load-supporting harness and wherein said canopy is cut to define at least one generally gore-shaped notch extending from the periphery thereof upwardly for a substantial distance toward the crown thereof; the combination of means for restraining portions of the edges of said notch against separation, a displacable extended gore segment generally conforming to the shape of said notch and having its upper end attached to said canopy adjacent the closed end of said notch, at least one lift cord extending between the free end of said extended gore segment and an adjacent location on the periphery of said canopy, and means for positively displacing outwardly at least a portion of said extended gore segment after said parachute has become deployed whereby to cause said extended gore segment to act as an air scoop to apply tension to said lift cord and to lift said adjacent peripheral portion of said canopy upwardly and outwardly to form an initial opening in the skirt of said canopy for the quick admission of air thereinto.

2. The parachute of claim 1 additionally including at least one suspension line extending between the free end of said extended gore segment and said harness whereby to draw said extended gore segment down into general configuration with said canopy as said canopy becomes fully opened.

3. The parachute of claim 2 which includes two said lift cords extending from the corners of the free end of said extended gore segment on two positions on the periphery of said canopy symmetrically disposed to either side of the median axis of said extended gore segment, and which includes two said suspension lines extending between the corners of the free end of said extended gore segment and said harness.

4. The parachute of claim 3 in said canopy is provided with at least two of said notches symmetrically disposed around the periphery thereof.

5. The parachute of claim 4 additionally including means for rendering said extended gore segment displacing means ineffective until said parachute has become fully deployed from its pack.

6. The parachute of claim 5 in which said gore segment displacing means includes a stationary plate secured to the fabric of said canopy adjacent the closed end of each of said notches, a movable plate overlying said stationary plate and hingedly connected thereto adjacent its upper end, means for attaching the upper end of said extended gore segment to a face of said movable plate, and resilient means for biasing said movable plate and at least a portion of said extended gore segment away from said stationary plate.

7. The parachute of claim 6 in which said means for rendering said gore segment displacing means ineffective includes a locking cone secured to said stationary plate and freely extending through and beyond said movable plate, said locking cone being provided with a transverse bore adjacent its free end, a locking pin fitted within said bore and with at least one portion projecting externally of said locking cone, and means for disengaging said locking pin from said bore after said parachute has become fully deployed from its pack.